July 9, 1940. A. G. OGDEN 2,207,265
PHOTOCOMPOSING MACHINE
Filed Feb. 21, 1938 7 Sheets-Sheet 2

INVENTOR.
ASHLEY G. OGDEN
BY Wm. J. Pritchard
ATTORNEY.

July 9, 1940.  A. G. OGDEN  2,207,265
PHOTOCOMPOSING MACHINE
Filed Feb. 21, 1938  7 Sheets-Sheet 3
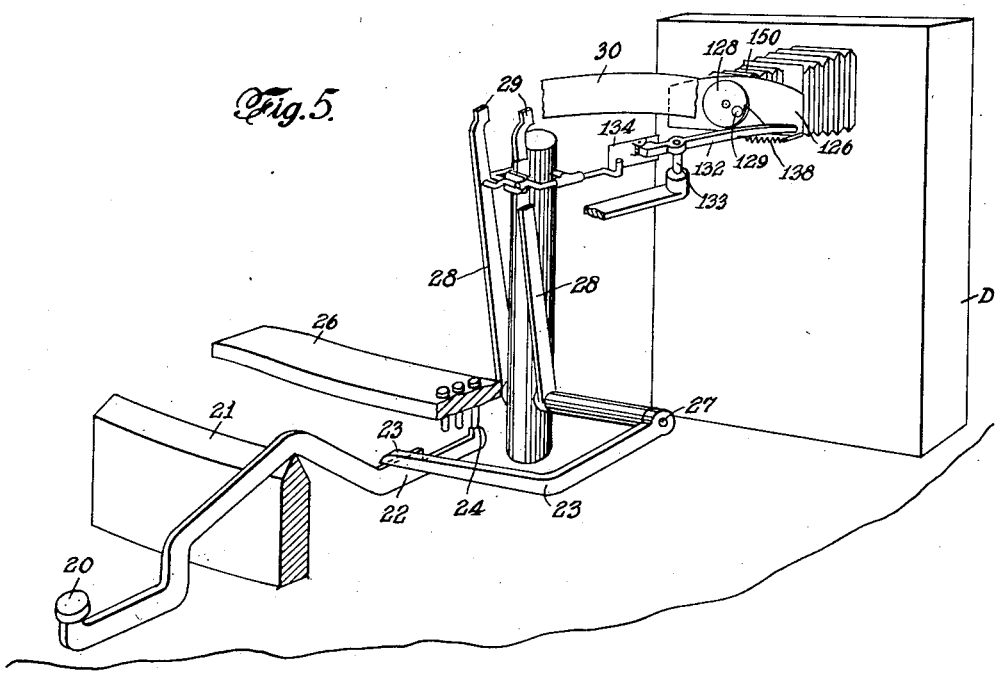
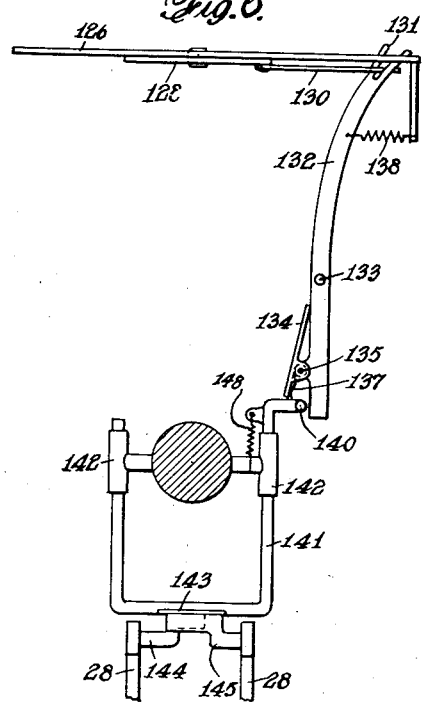
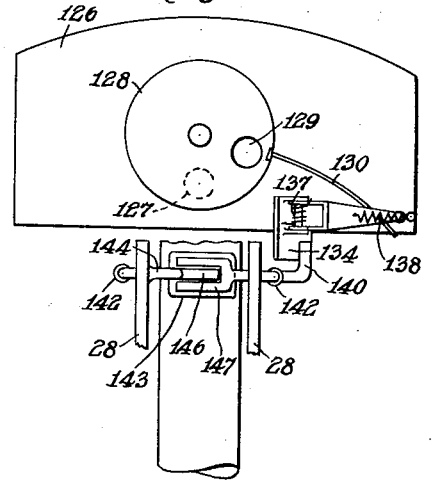
INVENTOR.
ASHLEY G. OGDEN
BY Wm. S. Pritchard
ATTORNEY.

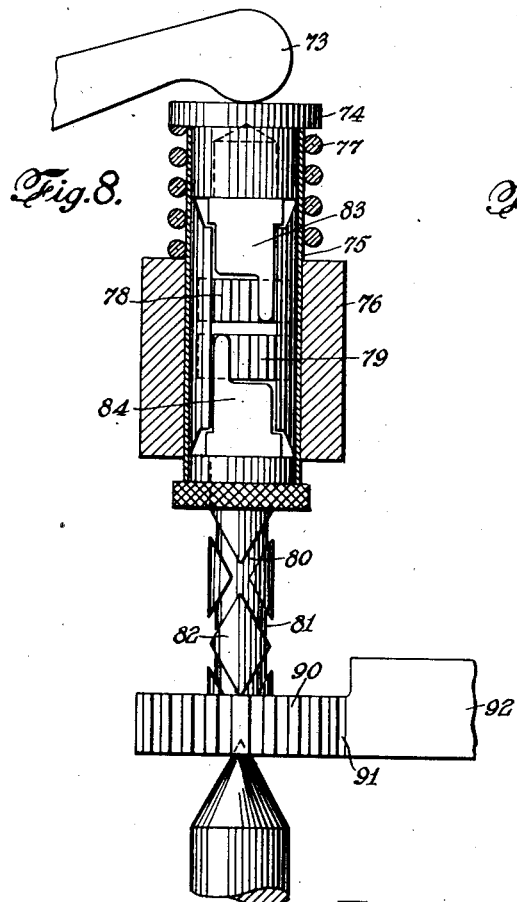
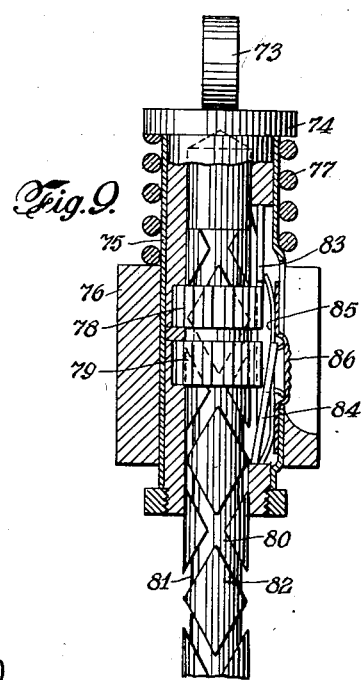
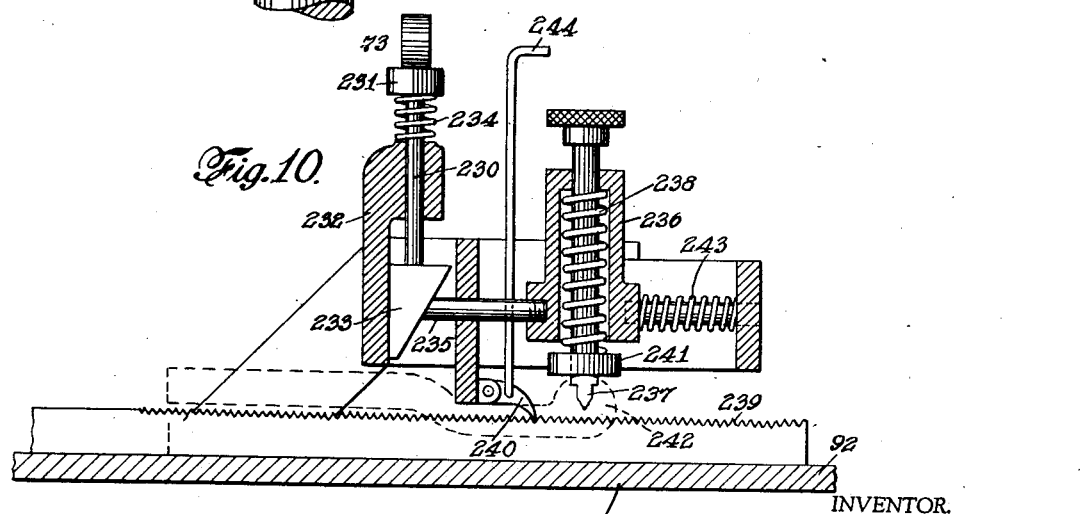

July 9, 1940. A. G. OGDEN 2,207,265
PHOTOCOMPOSING MACHINE
Filed Feb. 21, 1938 7 Sheets-Sheet 5
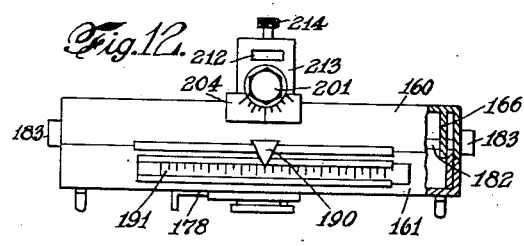
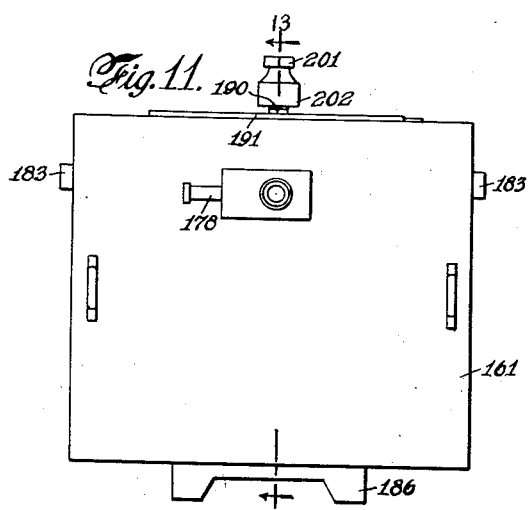
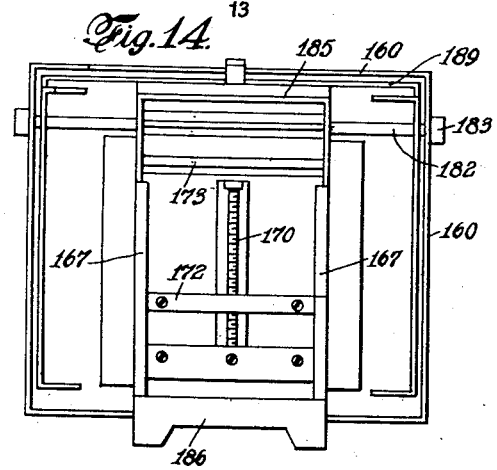
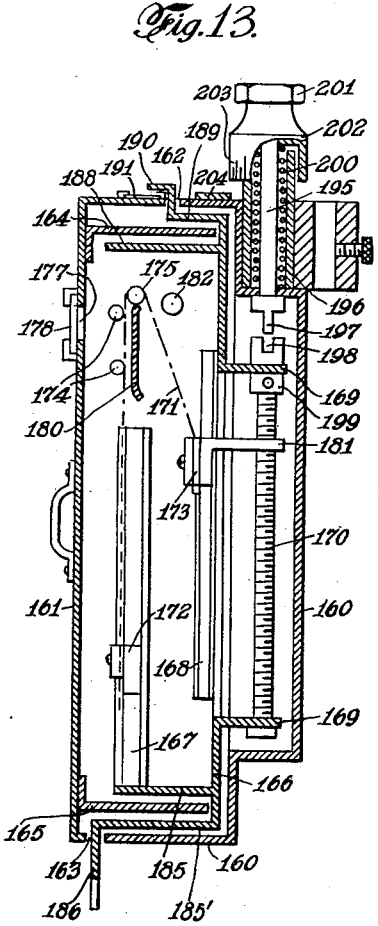
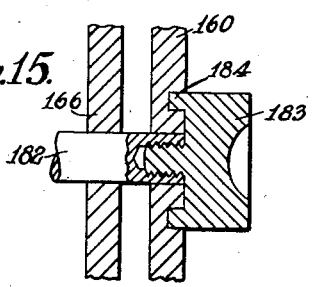
INVENTOR
ASHLEY G. OGDEN
BY WM. S. Pritchard
ATTORNEY July 9, 1940.  A. G. OGDEN  2,207,265
PHOTOCOMPOSING MACHINE
Filed Feb. 21, 1938  7 Sheets-Sheet 6

INVENTOR.
ASHLEY G. OGDEN
BY WM. S. Pritchard
ATTORNEY.

July 9, 1940.  A. G. OGDEN  2,207,265
PHOTOCOMPOSING MACHINE
Filed Feb. 21, 1938   7 Sheets-Sheet 7

INVENTOR.
ASHLEY G. OGDEN
BY
ATTORNEY.

Patented July 9, 1940

2,207,265

UNITED STATES PATENT OFFICE 2,207,265

PHOTOCOMPOSING MACHINE

Ashley G. Ogden, Baltimore, Md.

Application February 21, 1938, Serial No. 191,678

11 Claims. (Cl. 95—4.5)

This invention relates to a method and means for making a photographic type composition.

An object of the invention is to provide, in a machine of the above type, novel and improved means for spacing the individual characters in accordance with the requirements of each character.

Another object is to provide a novel and improved, interchangeable, master type slide which requires a minimum amount of space for storage and which may be readily inserted in the machine to enable the machine to be used with different styles of type.

Another object is to provide a novel and improved means for adjusting the spacing between characters in accordance with the particular type slide used.

A further object is to provide simplified and improved means for focusing the image of the master type upon the plate or film and adjusting the focus so as to control the size of this image, so that a single type slide can be used for making a composition having various sizes of characters thereon.

A further object is to provide means for varying the spacing of the characters in accordance with the size to which the image is focused on the sensitized film.

Another object is to provide a novel and improved plate or film carrier and actuating means therefor.

A further object is to provide a novel and improved shutter mechanism for exposing the film to the selected image.

A still further object is to provide a novel and improved justification mechanism for controlling the length of the line.

Other objects and advantages will become apparent as the nature of the invention is more fully disclosed.

Although the novel features which are believed to be characteristic of this invention are pointed out more particularly in the claims appended hereto, the invention itself may be better understood by referring to the following description, taken in connection with the accompanying drawings, in which a particular embodiment thereof has been set forth for purposes of illustration.

In the drawings:

Figure 3 is a side elevation of the pin bar used for controlling the spacing between characters;

Figure 4 is a section through the pin bar taken on the line 4—4 of Figure 3;

Figure 5 is a detail view of the shutter-operating mechanism;

Figure 6 is a top plan view of a portion of the mechanism shown in Figure 5;

Figure 7 is a partial front elevation of the mechanism shown in Figure 5;

Figure 8 is a detail view of the ratchet mechanism used for advancing the film carriage;

Figure 9 is a vertical section taken on Figure 8 with the gear, rack and feed plate omitted;

Figure 10 is a detail view of a different form of film-advancing mechanism illustrating another embodiment of the invention;

Figure 11 is a front elevation of the film carrier;

Figure 12 is a top plan view thereof;

Figure 13 is a section taken on the line 13—13 of Figure 11;

Figure 14 is a front elevation of the film carrier with the cover removed;

Figure 15 is an enlarged sectional detail of the light-proof joint used in the film holder for the carrier rail;

Figure 1:
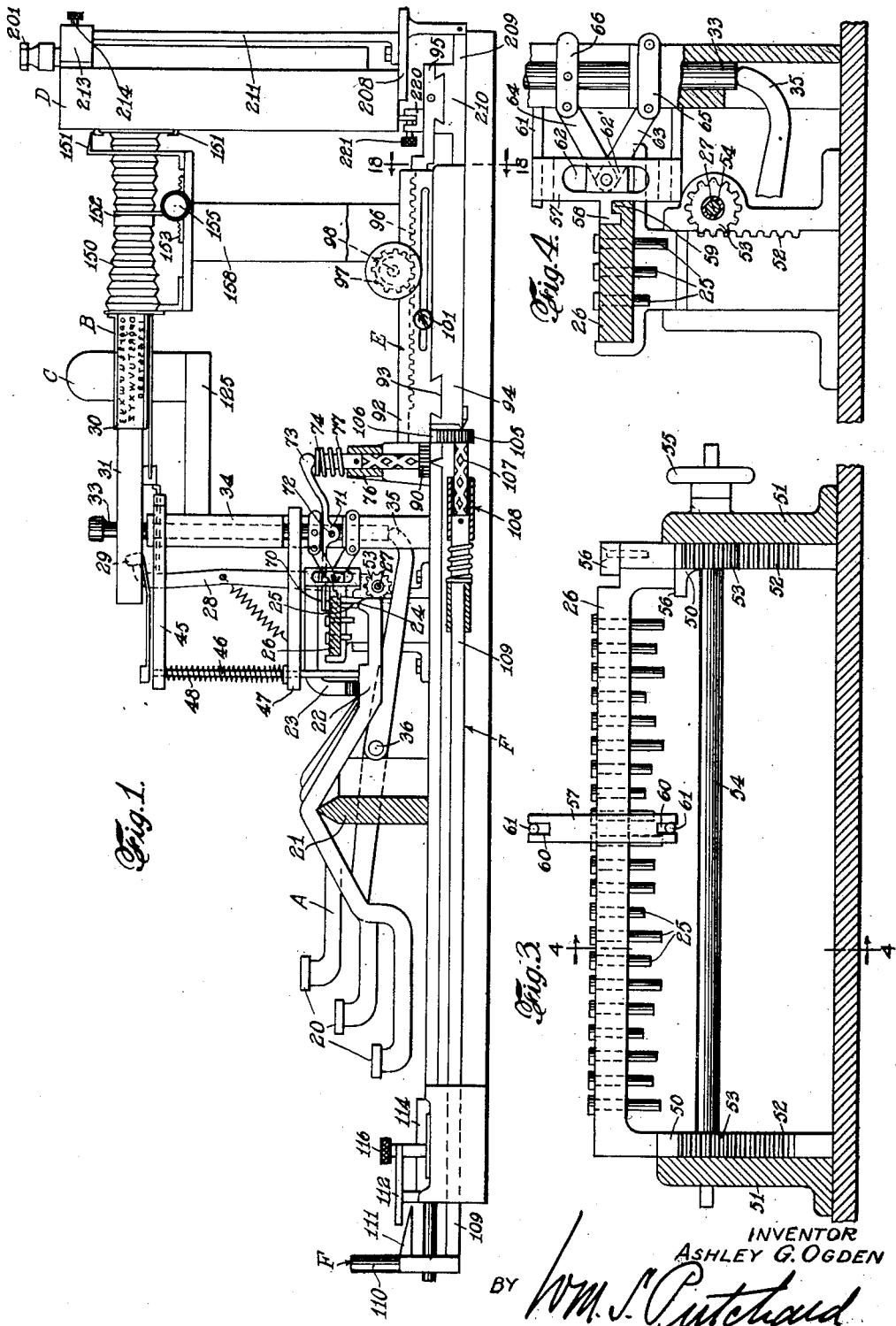
Figure 1 is a side elevation of a photo-composing machine embodying the present invention, with parts broken away for clearness.

In the following description and in the claims, certain specific terms are used for convenience in referring to various details of the invention. It is to be understood, however, that these terms are to be given as broad an interpretation as the state of the art will permit.

Referring to the drawings more in detail, the embodiment of the invention illustrated therein comprises in general a keyboard A (Figure 1) which is similar to a standard typewriter keyboard and controls, by suitable control mechanism, the position of a transparent master type slide B so as to bring any selected character on said slide into operative position. Light from a source of illumination C, passing through the slide B, serves to project the selected character onto a sensitized plate or film mounted in a film holder D. A feed mechanism E is provided to feed the film transversely of the machine for spacing the successive characters of the line in accordance with the composition being composed. The mechanism E also provides for adjusting the film holder D longitudinally of the machine so as to focus the image on the film to any desired size. A justification mechanism F is provided for correcting the spacing between words or between characters in such a manner so as to justify the lines or to produce lines having any desired arrangement. The actuating mechanism involved in the various parts is described more in detail below.

Keyboard and slide control mechanism

The keyboard A comprises a plurality of keys 20, which may be spaced and arranged in accordance with the keys of a standard typewriter or the like. The keys 20 may be mounted in any convenient manner. In the embodiment shown, each key is pivoted over a fulcrum bar 21 and carries at its free end, a shoulder 22 engaging a pivoted lever 23 and a shoulder 24 engaging a pin 25 carried in a pin bar 26, to be described. The lever 23 is pivoted at 27 (Figure 5) and actuates an arm 28 having a head 29 adapted to engage and control the movement of the slide in the manner to be described. It is to be noted that a pair of levers 23 are provided which are pivoted at opposite sides of the machine and actuate two independent arms 28. Furthermore, the shoulders 22 on the various keys 20 engage the lever 23 at different distances from the pivot point 27. Consequently, the keys which are located near the center of the machine cause a lesser angular movement of the lever 23 than the keys which are located near the ends of the machine. This difference in angular throw of the lever 23 and of the arm 28 caused by the various keys is utilized for selectively shifting the master type slide in the manner to be described.

The master type slide B is of arcuate form and is adapted to slide circumferentially in a channel 30 formed in a stationary arcuate support 31. The support 31 is carried on a frame 32 (Figure 2) which is attached to a central post 33. The post 33 is supported in suitable bearings in a housing 34 (Figure 1) and is adapted to be raised or lowered by an arm 35 which engages under the lower end of said post. The arm 35 is attached to a shaft 36 (Figure 2) which is controlled by shift keys 37. These shift keys correspond to the usual shift keys of a typewriter and are used to variably elevate the support 31 so as to bring different lines of characters on the master type slide B into operative position.

The type slide B may, for example, comprise a light-transmitting film or plate in the form of a negative having the type characters printed thereon. The characters may be arranged in three rows. One of these rows, which may constitute the lower case characters, is at the top of the slide and is normally in operative position. A second row of characters, which may, for example, comprise the capital letters, is located below the first row and is adapted to be brought into operative position when one of the shift keys 37 is actuated to elevate the support 31. The third row of characters, which may, for example, comprise figures, may be mounted below the second row and may be brought into operative position by further elevation of the support 31 in response to actuation of the other shift key 37. It is to be understood that any desired number of rows of characters may be provided. In certain instances, two such rows may be used and only a single shift key employed; or, if desired, more than three rows of characters may be provided and may be actuated by the corresponding number of shift keys or by one or more of such keys having suitable stops to control the movement thereof. In order to lock the keys 37 down when it is desired to retain the support 31 in shifted position, latches 38 may be provided.

For controlling the lateral position of the master slide, a frame 40 may be provided (Figure 2) which is pivoted about the post 33 and may rest against the upper end of the housing 34. This frame has an arcuate member 41 located within the arcuate support 31 and below the operative position of the characters so as not to interfere with the passage of light rays therethrough. This member 41 is provided with one or more pins 42 which engage the slide B and control the lateral position thereof. The frame 40 is provided with a pair of shoulders 43 which are engaged by the heads 29 of the arms 28 to cause the frame 40 to move either clockwise or counterclockwise, depending upon the particular arm 28 which is actuated. The frame 40 is also provided with an arm 44 which extends rearwardly over an arcuate plate 45 through which a plurality of pins 46 extend. These pins 46 are carried in said plate 45 and in a lower plate 47 in a position such that each pin 46 rests upon the shoulder 22 of one of the keys 20. Each pin is held in its lower position by a spring 48. The pins 46 are thus arranged so that the pin which is elevated by the depression of any key 20 serves as a stop to engage the arm 44 and limit the movement of the frame 40 and of the master type slide B, so as to bring the selected character into operative position. It will be noted that the frame 40 is mounted independently of the support 31 and the post 33, and engages the selected pin 46 regardless of the vertical position of said support. The pins 42 are extended vertically so as to control the lateral position of the slide B when the slide is shifted into its different vertical positions.

Feed mechanism

Figure 2:
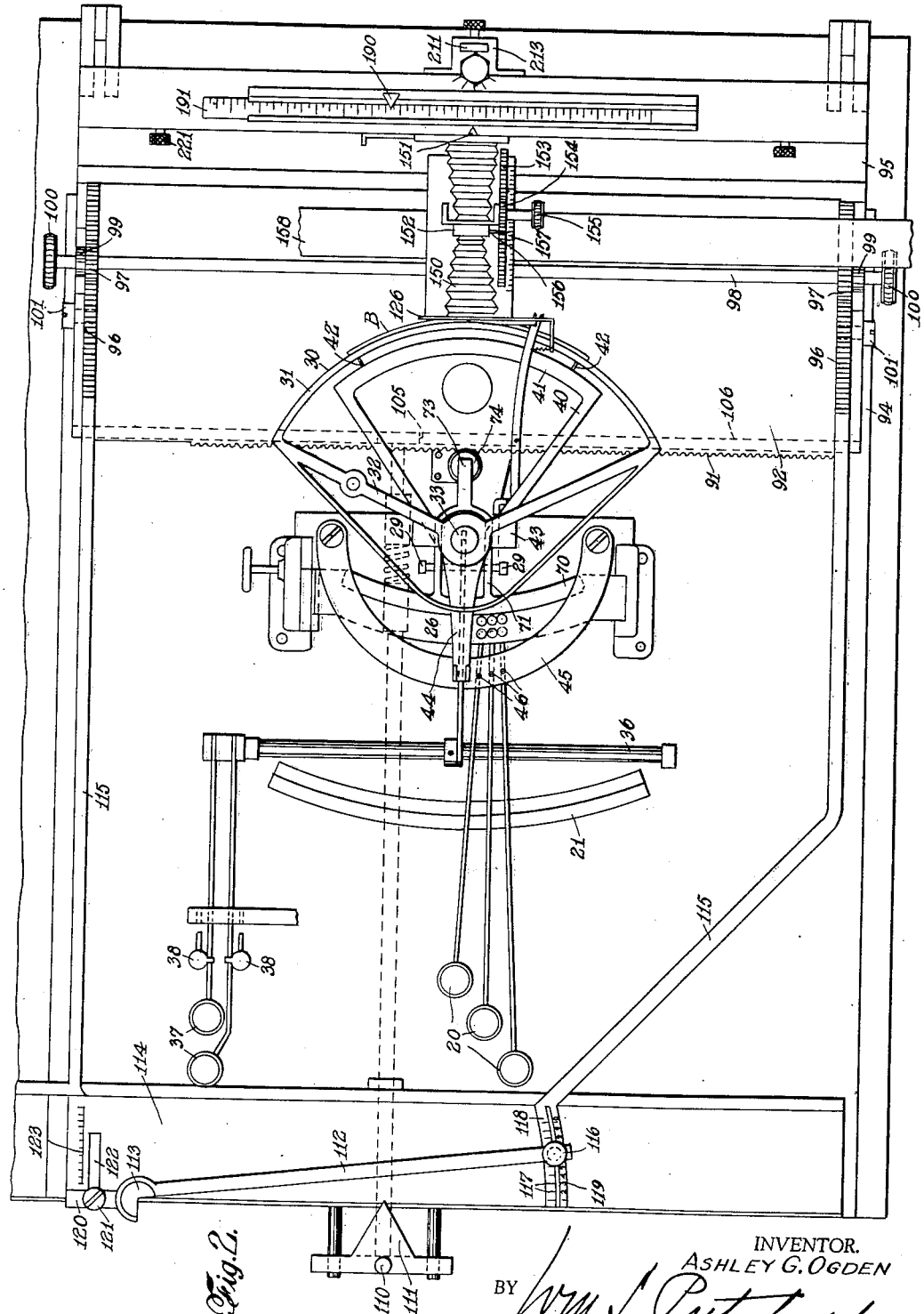
Figure 2 is a top plan view of the machine.

The pin bar 26 is of arcuate form (as shown in Figure 2) and carries a plurality of arcuate rows of pins 25 which are arranged so that the different pins of each row are in position to be engaged by the shoulders 24 of the various keys 20, the particular row of pins which is in operative position depending on the lateral position of the pin bar 26.

The pin bar 26 is slidably mounted on a pair of rack members 50 (Figures 3 and 4) which in turn are slidably held for vertical movement in standards 51 located on opposite sides of the machine. A rack 52, carried by each rack member 50, is engaged by a gear 53 mounted on a sleeve 54 which extends across the machine and is actuated by a control wheel 55 to variably adjust the vertical position of the pin bar 26. The pin bar 26 may be held at one end between shoulders 56 carried by one of the rack members 50 and can be released therefrom by being slid transversely of the machine toward the left (as seen in Figure 3) so that it may be removed from the machine for purposes of replacement.

The pin bar 26 is also mounted for lateral sliding movement on the rack members 50, which movement is controlled by a yoke 57 having a hook 58 engaging a complementary hook 59 on the pin bar. The yoke 57 is provided with elongated slots 60 which ride on stationary pins 61 as the yoke 57 is shifted laterally and vertically with the pin bar 26. The yoke 57 is provided with an elongated aperture 62 in which a block 62' rides. This block is attached to links 63 and 64. The link 63 may be pivotally attached to a collar 65 carried by the housing 34. The link 64 may be attached to a collar 66 which is attached to the post 33.

The arrangement above described is such that vertical movement of the post 33, acting through the links 63 and 64, causes the yoke 57 to be retracted, thereby shifting the pin bar 26 laterally a distance such that either the second or the third row of pins is in alignment with the shoulders 24 of the keys 20, the particular row of pins selected depending upon whether the post is shifted to bring either the second or the third row of characters of the master slide B into operative position. In this way, individual pins 25 are provided for each character on the master slide B.

The pins 25 are loosely held in the pin bar 26 so that they can be pushed upwardly therein by the shoulders 24 of the various keys. Located above the row of pins 25 which is in operative position is an arcuate feed bar 70 which is mounted on a bracket 71 pivoted to the housing 34 by a pin 72 and is provided with an arm 73 which is adapted to engage and depress a plunger 74, forming a part of a ratchet mechanism to be described. The feed bar 70 is moved upwardly by the action of the selected pin 25 through a distance corresponding to the length of such pin. These pins are graduated in length in accordance with the spacing requirements of the selected characters on the master slide, the pin corresponding to the "M" or "W", for example, being the longest, and the pin corresponding to the "I" or the "period" being the shortest. The movement of the arm 73 is accordingly made proportional to the spacing requirements of the selected character.

The ratchet mechanism is shown more in detail in Figures 8 and 9 and comprises a sleeve 75 which is slidable vertically in a housing 76, carries at its upper end the plunger 74 and is held in its upper position by a spring 77. The sleeve 75 carries a pair of gears 78 and 79, provided with feathers (not shown) which engage oppositely inclined channels 80 and 81 in a shaft 82. The gears 78 and 79 are selectively locked to the sleeve 75 by arms 83 and 84 which are alternately held in engagement with the respective gears by a spring 85 controlled by a slide 86. The arrangement is such that when the slide 86 is in one position, for example its lower position, one of the gears, for example the gear 78, is locked, and axial movement of the sleeve 75 causes the shaft 82 to rotate in a given direction. The gear 78, however, is released automatically upon the return movement of the sleeve 75 so that the shaft 82 is progressively moved in the same direction by amounts proportional to the successive axial movements of the sleeve 75, which in turn are proportional to the movements of the arm 73. The slide 86 permits this movement to be reversed or the entire mechanism to be released when desired.

The shaft 82 carries a gear 90 which meshes with a rack 91 on a feed plate 92. The feed plate 92 is dovetailed, as at 93 (Figure 1), for transverse sliding movement in a base plate 94. The feed plate 92 carries a carriage plate 95 which is mounted for longitudinal adjustment with respect to the feed plate 92. This adjustment of the carriage plate 95 is controlled by racks 96 attached thereto and engaged by gears 97 carried on a shaft 98 journaled in ears 99 formed on the feed plate 92. A hand wheel 100 may be attached to the shaft 98 for facilitating the adjustment. A set screw 101 may be provided to clamp the feed plate 92 to the carriage plate 95 after suitable adjustment thereof has been made by the mechanism above described.

The carriage plate 95 controls the movement of the film within the film carrier D in the manner to be later described. It will be noted that the feed mechanism operates to feed the carriage plate 95 transversely a distance proportional to the movement of the arm 73, which is in turn proportional to the length of the pin 25 which is actuated by the selected key 20.

The feed is further adjusted by varying the elevation of the pin bar 26 by means of the control handle 55 above described. This vertical adjustment of the pin bar 26 changes the spacing of all of the characters and is used to adjust the mechanism to the size of character which is being composed. For example, if the pin bar 26 is at a higher position, the key 20 is depressed further before the shoulder 24 thereof engages the selected pin 25. Consequently, the pin 25 is raised less and causes a lesser movement of the feed bar 70. This vertical adjustment of the pin bar 26 is made to correspond with the adjustment of the optical system, to be described, and in accordance with the type size of the final composition. It will be noted, therefore, that a single pin bar may be used with each master type slide and can be adjusted to properly space the characters regardless of the size to which they are focused on the sensitized film. When the master slide is changed to a slide having characters requiring different spacing characteristics, the pin bar is removed and a new pin bar, corresponding to that of the new master slide, is substituted therefor.

*Justification mechanism*

In the embodiment shown, the justification mechanism F also controls the position of the feed plate 92, although it could be connected to control the position of the master slide and optical system if desired. This mechanism comprises a gear 105 engaging a rack 106 mounted on the feed plate 92. The gear 105 is carried by a shaft 107 which is actuated by a ratchet mechanism 108 similar to the ratchet mechanism shown in Figures 8 and 9 and described above. This ratchet mechanism 108 is variably operated by axial movement of a rod 109 which extends to the front of the machine and carries a justifier bar 110 by which it is manually actuated. The justifier bar 110 also carries a stop 111 which is arranged to engage an arm 112 to limit the movement of the bar 110 and of the rod 109. The arm 112 is pivoted, as at 113, to a plate 114 which is attached by a frame 115 to the feed plate 92 and is fed transversely therewith.

The arm 112 may be pivotally adjusted about the pin 113 and for this purpose carries at its free end a set screw 116 adapted to engage and hold the arm 112 in selected notches 117 formed in an arcuate rack 118. A scale 119 is provided for designating the various notches 117 so as to assist in adjusting the arm 112. The pin 113 may be carried in a bracket 120 which is slidably mounted in the plate 114 for movement longitudinally of the machine and may be held in adjusted position by a set screw 121 engaging a slot 122 in said plate 114. A scale 123 may be provided to facilitate the adjustment of this bracket 120. It will be noted that as the bar 110 is pushed inwardly until the stop 111 engages the arm 112, the feed plate 92 is fed transversely by the action of the gear 105 and rack 106, and of the ratchet mechanism 108. The amount of this movement is controlled by the adjustment of the bar 112, as will be described.

Optical system

The optical system comprises a light source C which may be of any standard construction and, in the form shown, is mounted on a bracket 125 attached to the housing 34. This source C is positioned in alignment with an aperture plate 126 (shown more in detail in Figures 5 to 7) having an aperture 127 formed therein in alignment with the character on the slide B which is in the selected position. The aperture 127 is normally closed by a shutter mechanism comprising a disc 128 pivoted to the aperture plate 126 and having an aperture 129 adapted to register with the aperture 127 when the shutter is open. The disc 128 carries an arm 130 which is engaged in the forked end 131 of a lever 132. This lever 132 is pivoted at 133 and carries a spring plate 134 which is pivoted thereto by a pin 135 and is normally held in the position shown in Figure 6 by a spring 137. A spring 138 normally holds the lever 132 in such position that the apertures 127 and 129 are out of alignment.

For actuating the lever 132 there is provided a pin 140 carried by a U-shaped frame 141 which is slidably held in bearing members 142 attached to the housing 34. The U-shaped frame 141 is provided with an enlarged plate 143 at the central portion thereof and in alignment with the axis of the housing 34. For actuating the frame 141, brackets 144 and 145 are provided, which are attached to the arms 28. These brackets 144 and 145 are bent inwardly and are provided with aligned fingers 146 and 147 respectively (Figure 7), which are adapted to bear against the plate 143 when either of the arms 28 is actuated by the key mechanism above described. The movement of the arms 28 accordingly causes the U-shaped frame 141 to slide in the bearing members 142, thereby causing the pin 140 to slide past the end of the spring plate 134, the spring 137 allowing the plate 134 to pivot about the pin 135 so as to permit the pin 140 to pass freely. When the arm 28 is retracted, a spring 148 returns the U-shaped frame 141 to its original position. During this return movement, the pin 140 rides on the outer surface of the spring plate 134, thereby causing pivotal movement of the lever 132 in a direction to rotate the disc 128 so as to bring the aperture 129 thereof into alignment with the aperture 127 in the aperture plate 126. When the pin 140 has moved out of engagement with the spring plate 134, the spring 138 retracts the lever 132. The shutter mechanism accordingly serves to make a timed exposure of the sensitized film or plate, to be described, during the return stroke of the key 20. The exposures may be accurately timed and are not governed by the rapidity by which the keys are depressed. Furthermore, they take place at a time while all of the mechanism is stationary. It is to be understood that the details of construction of the shutter and of the operating mechanism may be varied. The particular embodiment thereof has been shown merely for purpose of illustration.

The aperture plate 126 is attached to or located closely adjacent one end of an expansible bellows 150 (Figure 1), the other end of which is attached to a frame 151 located adjacent the plate or film holder D, to be described. A lens assembly 152 may be mounted within the bellows 150 and may be axially adjusted by means of a rack 153 and a pinion 154 controlled by a handle 155. A suitable pointer 156 may be attached to the lens assembly and may cooperate with a scale 157 to assist in adjusting the lens. The bellows 150 and the lens assembly may be mounted on a suitable bracket 158 attached to the frame of the machine. The purpose of the lens adjustment is to control the size of the image of the selected character as it is focused on the sensitized plate or film. In this way, a single master slide may be used for making compositions having a large number of different sizes of type, it being necessary to replace the master slide only when a different style type is to be used.

Film holder

The film holder D is shown in detail in Figures 11 to 15. This film holder comprises the box or housing 160 and a cover 161 which is secured to the box to provide a light-tight joint except at the top and bottom where slots 162 and 163 respectively are formed. The cover is provided with shields 164 and 165 at the top and bottom respectively, which extend over the slots 162 and 163 so as to provide a light-seal. The film carrier which is mounted within the film holder comprises a frame 166 carrying spaced pairs of side channels 167 and 168 and rearwardly extending ears 169 carrying a threaded rod 170. A sensitized film 171 is attached at its two ends to cross bars 172 and 173 respectively, which are adapted to slide vertically in the side channels 167 and 168 respectively. The film extends vertically from the cross bar 172 and is threaded under idler rollers 174 and over roller 175, and thence downwardly to the cross bar 173.

The cover 161 is provided with an aperture 177 which has a slide 178 disposed thereover and adapted to close the same when the film holder is taken from the machine. A shield 180 is disposed in back of the film, opposite the aperture 177, to prevent light rays from engaging the parts of the film at the back of the holder and also to form a firm support for the film as it passes the aperture 177. The cross bar 173 may be provided with an ear 181 which is in threaded engagement with the rod 170 and is adapted to be fed vertically by said rod. The weight of the cross bar 172 may be made sufficient to hold the film tight as it is advanced by a movement of the ear 181.

The frame 166 may be slidably mounted on a rail 182 which is supported in the box 160 and may be removably held by end nuts 183 having flanges 184 engaging grooves in the box 160 to form a light-seal (as shown in Figure 15). At the lower end, the frame 166 is provided with shields 185 and 185' which extend on opposite sides of the shield 165 to form a light-seal. The shield 185 may support the side channels 167, and the shield 185' may be extended downwardly through the slot 163 to provide a control flange 186 by which transverse movement is imparted to the film carrier by the carriage plate 95. At the top, the frame 166 is provided with a pair of shields 188 and 189 which extend on opposite sides of the shield 164 of the cover 161 to form a light-seal. The shield 189 may extend outwardly through the slot 162 to form a pointer 190 cooperating with a scale 191 mounted on the cover 161 to show the transverse position of the film carrier. This scale 191 permits the carrier to be adjusted for properly positioning the characters on the sensitized material.

Suitable means may be provided for effecting vertical movement of the film so as to shift the same between lines. In the embodiment shown, this means comprises a hand-operated plunger 195 mounted in a housing 196 attached to the box 160 and provided at its lower end with a key 197 adapted to engage a slot 198 formed in a collar 199 attached to the top of the rod 170. A spring 200 may be positioned about the plunger 195 to normally hold the same elevated, and an operating handle 201 may be attached to the top of this plunger and may be provided with a downwardly extending skirt 202 having a scale 203 cooperating with a pointer 204 attached to the box 160 to show the position of adjustment of the film. This scale 203 facilitates the setting of the lines and the spacing thereof vertically of the film. The plunger 195 is located in position to actuate the shaft 170 when the carrier is at a designated transverse position, such as, for example, at a position corresponding to the beginning of each line, so that when the film carrier is returned for beginning a line, the handle 201 may be manually actuated to advance the film upwardly the necessary distance.

It will be noted that in the above construction, the film holder can be removed from the machine as a unit without danger of exposing the film to light. The entire holder may be then taken to a dark room for removing the film therefrom. In this way, the insertion or removal of a film may be accomplished rapidly by an unskilled operator without danger of exposing the film to light.

The film holder may be mounted on a bracket 208 (Figure 1) which may be attached to a plate 209 carrying a block 210 in which the carriage plate 95 is dovetailed for relative transverse movement. The plate 209 is slidably held by the base plate 94 for movement longitudinally of the machine with the carriage plate 95 and provides means for shifting the film holder axially of the light-beam for focusing the image to a selected size thereon.

In order to properly position the film holder, a vertical rod 211 is attached to the bracket 208 and extends upwardly through an aperture 212 in a bracket 213 attached to the back of the film holder. The film holder may be secured in position by a set screw 214 carried in the bracket 213. It is, of course, to be understood that other means for securing the film holder in place may be substituted therefor.

For effecting the desired transverse feeding of the film carrier, a pair of ears 220 are attached to the carriage plate 95 in a position to engage the control flange 186 of the film carrier, which may be secured thereto by set screws 221. In this way, transverse movement of the carriage plate 95 is imparted to the film carrier for feeding the film transversely, whereas longitudinal movement of the carriage plate 95 is imparted to both the film carrier and the film holder for focusing purposes, as above described.

*Operation*

In operating this machine, the sensitized film upon which the composition is to be set up is placed in the film holder in a dark room and is attached to the cross bars 172 and 173 which are adjusted so that the top line which is to be composed is opposite the aperture 177. It is to be understood that this sensitized film is of a size corresponding to that of the finished composition, or, in the event that the composition is to be re-photographed such, for example, as for justification, the film or sensitized material may be of a larger size so that the characters can be formed thereon in a size larger than that of the finished composition. In this way, the subsequent re-photographing and justification is simplified and the errors are minimized.

The film holder is now attached to the machine (as shown in Figures 1 and 2) by mounting the same on the brackets 208 with the rod 211 extending through the bracket 213 of the film holder. It may be locked in this position by the set screw 214. The lens assembly 152 and the film holder D are now adjusted, by means of the handle 155 attached to the lens assembly 152 and the hand wheel 100 which actuates the plate 95, to focus the image to the required size, suitable scales being provided to show the required position of both the lens assembly and the plate holder for producing any desired size of image. After this adjustment has been made, the carriage plate is secured by means of set screw 101 which prevents any further longitudinal movement from taking place.

After the film holder has been positioned and adjusted, the film carrier is shifted transversely to a position for receiving the first image, as, for example, at the beginning of the line. This adjustment is made manually by merely pushing the film holder or the feed plate 92 in a manner similar to shifting a typewriter carriage.

The desired master slide B is now selected and is positioned in the channel 30. For this purpose, it may, for example, be slid circumferentially within the channel 30 formed on the front of the support 31. The pins 42 are now attached to the master slide so as to cause the same to be actuated by the frame 40. The proper pin bar 26 to go with the selected master type slide B is inserted in the rack members 50 and is adjusted to the size of image by the control handle 55.

The machine is now ready for composing, which is effected by pressing a selected key 20. When the key 20 is depressed, the shoulder 22 thereof elevates the lever 23 and the corresponding pin 46. The lever 23 causes the arm 28 to be actuated, thereby bringing the head 29 thereof against the shoulder 43 of the frame 40 and causing the frame to be rotated about the shaft 33 until the arm 44 engages the pin 46 which has been elevated and forms a stop. The selected character is now in position opposite the aperture 127 of the aperture plate 126 and is ready to be projected onto the film 171 and be photographed thereon.

The depression of the key 20 also causes the shoulder 24 thereof to engage a pin 25, elevating that pin and the feed bar 70, which causes the arm 73 to be depressed by an amount proportional to the length of the pin 25. This arm 73, acting through the ratchet mechanism (shown in detail in Figures 8 and 9), rotates the gear 90 which acts on the rack 91 to shift the feed plate 92 transversely the distance required for the particular width of character to be printed. When the key 20 is released, the shutter mechanism (shown more in detail in Figures 5, 6 and 7) is actuated by the return movement of the pin 140 engaging the spring plate 134 and operating the lever 132. The shutter accordingly is opened for a period of time sufficient to expose the film and effect the desired impression thereon. It is to be noted that this time of exposure is entirely independent of the speed of key action and takes place while the master slide and film are stationary and the image is properly positioned on the film. The time of exposure is determined by the length of the spring plate 134 and the tension of the various springs which control the rate of return of the key and associated mechanism.

When the next character is to be printed, the operation is repeated by depressing another key 20. It will be noted that by means of the pins 25, a movement of the feed plate 92 is effected in each instance which corresponds to the width of the character to be printed. It is, of course, to be understood that a suitable spacer bar may also be provided to cooperate with a spacer pin to effect the necessary spacing between words or groups of characters. The master slide B may be shifted vertically to select the desired row of characters by means of the shift keys 37 which act through the lever 35 to elevate the post 33 and the support 31 for the above purpose.

The composition is continued in the manner above described until the end of a line is reached. At this point, the film holder is manually returned and the film is shifted to a position to receive the next line by means of the manual handle 201 (as shown in Figure 13). This handle 201 actuates the rod 170 for feeding the ear 181 downwardly, thereby feeding the film 171 to its next position.

After the entire selection has been composed, and before the end of the film 171 is reached, the film holder may be closed by sliding the shutter 178 over the aperture 177. The film holder can then be removed from the machine, taken to a dark room for developing, and replaced by a holder containing a fresh film.

*Justification*

The composition set up in the manner above described will be unjustified, that is, the ending of the lines will be irregular as in an ordinary typewritten page. In order to justify such a composition, it may be recomposed on the above machine, utilizing the justifying bar 110 to correct the spaces between words. For this purpose, the composition is first corrected for typographical errors and is then used for a copy from which a new print is made. Before each line is composed, the error in length thereof is noted. The line, for example, may be six units short of a desired standard. The arm 112 is now set into an angular position, such as that shown in Figure 2, corresponding to six units on the scale 119 and is locked in this position. The arm 112 and the justifying mechanism, including the justifier bar 110 and the ratchet mechanism 108, are so designed that the total movement of the justifier bar 110, which takes place from its initial position until the stop 111 engages the arm 112 when the carriage and bar are fully advanced to their extreme position, effects a transverse movement of the film carrier corresponding to the above-mentioned six units.

The composition is now set up in the manner above described, except that in addition to the actuation of the usual spacer bar between words or groups of characters the justifier bar 110 is also actuated by pressing the same to the limit of its movement, that is, until the stop 111 engages the arm 112, the justifier bar remaining in its actuated position until it is further advanced at the next actuation thereof which may take place in the space following the next word. In this way, the space after each word is increased an amount such that the total increment equals the number of units by which the line was short of the selected standard.

If the line as originally typed is long instead of short, the operation is the same except that the ratchet mechanism 108 is set to reverse the movement of the film carrier so as to shorten the space between words. In this way, by re-typing the composition and making the necessary adjustment of the arm 112 for each line, a properly justified final copy is produced. It is, of course, to be understood that the unjustified copy could be set up on some other type of machine, provided the relative widths of the various letters are the same so that the spacing effected corresponds to that which would be produced by the above-described machine. If the error to be corrected by justification is small, the justification may be effected at one or more places in the line and need not be distributed through the entire line. The present invention, however, provides a mechanism which can be used to distribute this error throughout the entire line if desired, inasmuch as the total justification depends on the total throw of the justifying bar 110 and not upon the number of times which it is actuated. The justifying bar is automatically returned to its original position when the film-carrier is returned, by the cam action of the arm 112 on the stop 111, or it may be manually returned if desired.

Figure 17:
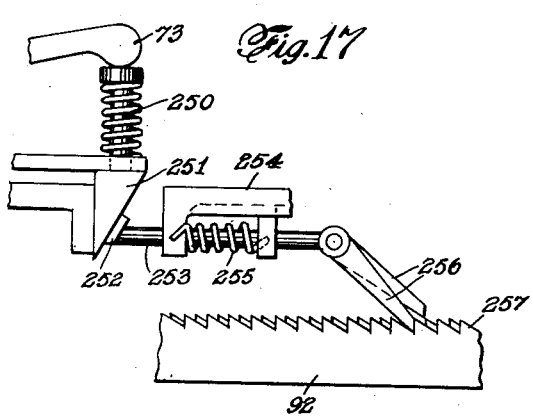
Figure 17 is a detail view of another type of ratchet mechanism for controlling the spacing between characters.
Figure 18:
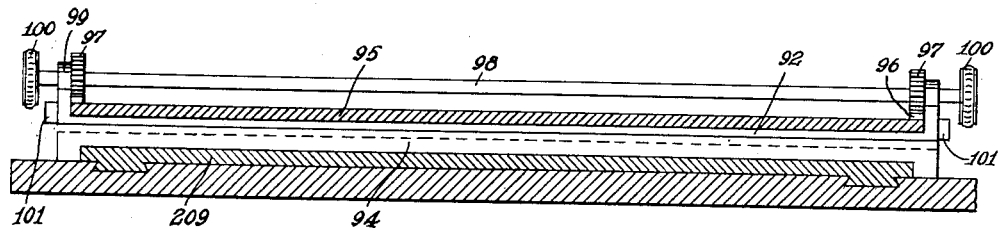
Figure 18 is a section taken on the line 18—18 of Figure 1, looking in the direction of the arrows.

*Modified feed mechanisms of Figures 10 and 17*

In Figure 10, a modified type of feed mechanism is disclosed which may replace the ratchet mechanism of Figures 8 and 9. Referring to Figure 10, the mechanism comprises a plunger 230 having a head 231 adapted to be engaged by the arm 73 for the purpose above mentioned. The plunger 230 is held in a housing 232 and slidably actuates a wedge 233, being normally held in its upper position by a spring 234. The wedge 233 controls a horizontal rod 235 which actuates a carriage 236 carrying a pawl 237 which is pressed downwardly by a spring 238 into engagement with a rack 239 attached to the feed plate 92 above mentioned. A pawl 240 may be provided to engage the rack 239 to lock the same against reverse movement. For raising the pawl 237 and returning the same, a collar 241 is provided which is engaged by a lever 242. This lever 242 causes the pawl 237 to release the rack 239. A spring 243 then returns the pawl 237 to its initial position when the wedge 233 has again been raised by means of the spring 234.

The lever 242 (shown more in detail in Figure 16) may be pivoted to the housing 232 and may extend rearwardly and form a release bar 242' which is disposed over the ends of the keys 20 so that when a key 20 is depressed the lever 242 is depressed, and when the key 20 is released the lever 242 is elevated to release the pawl 237 as above mentioned.

In this embodiment, when the feed bar 70 is actuated, it depresses the lever 242 to bring the pawl 237 into engagement with the rack 239 and also depresses the arm 73 a predetermined amount. This arm, acting on the plunger 230, causes a vertical movement of the wedge 233 and a corresponding horizontal movement of the rod 235 and carriage 236, thereby shifting the feed plate 92 the selected distance. When the feed bar 70 is returned to its original position, the arm 73 releases the plunger 230, and the lever 242 raises the pawl 237 to permit the carriage 236 to return to its original position. In this embodiment, the pawl 240 holds the feed plate 92 in its advanced position. A handle 244 may be provided to release the pawl 240 when it is desired to return the feed plate. It is to be understood that this type of feed may be substituted for that shown in Figures 8 and 9 if desired.

A further type of feed is shown in Figure 17 which comprises a plunger 250 actuated by the arm 73 to depress a wedge 251. The wedge 251 cooperates with a wedge block 252 carried by a rod 253 which is slidably mounted in a frame 254 and is normally held at its initial position by a spring 255. The rod 253 carries one or more pawls 256 which engage corresponding racks 257. The racks 257 may be attached to the feed plate 92 as above mentioned. If a plurality of racks 257 are used, the teeth are preferably offset so as to obtain the effect of a rack having a greater number of teeth.

In this embodiment, the rack 257 is advanced by an amount proportional to the amount of depression of the plunger 250, the operation being otherwise similar to that of the mechanism of Figure 10. It is, of course, obvious that other types of feed mechanism may be utilized as desired in order to effect a variable feed which automatically advances the film in accordance with the width of the particular character which is being composed.

Figure 16:
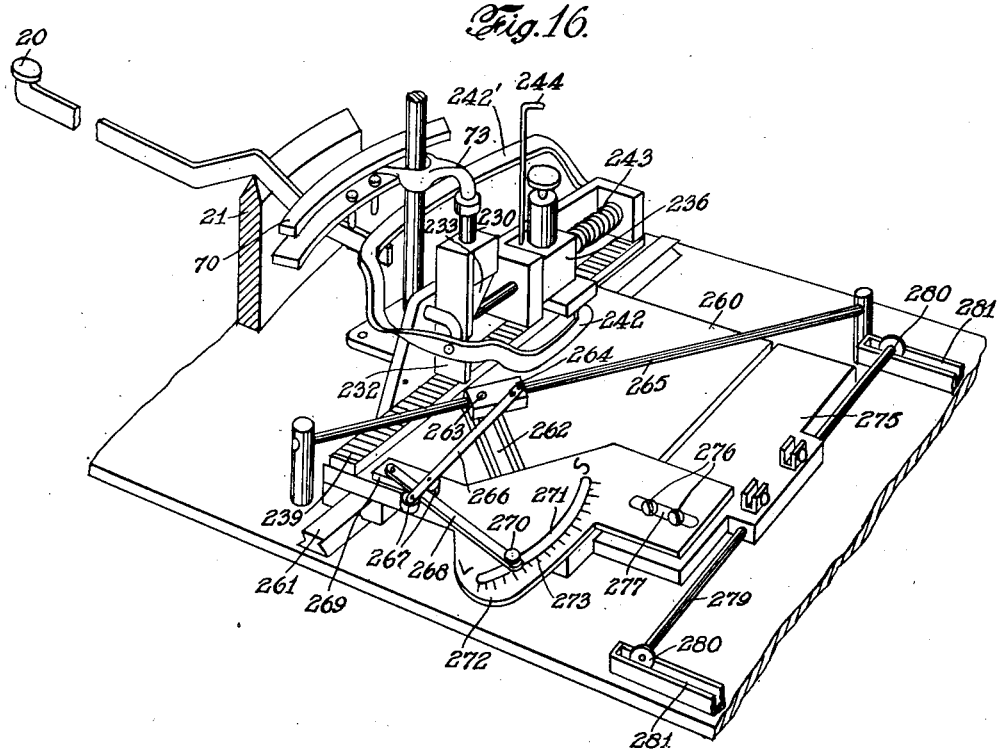
Figure 16 is a perspective view of another form of mechanism for advancing the film carrier illustrating a further embodiment of the invention.

The film carrier feed of Figure 16

Figure 16 shows a different embodiment of film carrier feed in which provision is made for adjusting the relative movement of the film carrier in accordance with the size of the characters being composed. This feed comprises a feed plate 260 which is slidably mounted for transverse movement on a stationary rail 261 and carries a rack 239 which cooperates with any of the feed means above described. In the embodiment shown, the rack 239 is actuated by the feed mechanism shown in Figure 10 and described in connection therewith, so that the rack and feed plate 260 are advanced a predetermined amount in accordance with the character to be composed.

The feed plate 260 is provided with an inclined slot 262 in which rides a pin 263, carried by a slide 264 mounted on an inclined rod 265. The slide 264 carries an arm 266 which is rigidly secured thereto and is provided at its ends with rollers 267 or the like, engaging opposite sides of a lever 268 which is pivoted to a bracket 269 and may be adjusted by means of a set screw 270 engaging an arcuate slot 271 in a plate 272, the position of adjustment being designated by a suitable scale 273. The bracket 269 is adjustably attached to a carriage plate 275 by means of set screws 276 passing through elongated slots 277 in said bracket. The carriage plate 275 is slidably mounted for transverse movement on a rail 279 which may be supported at its ends by rollers 280 movable longitudinally of the machine in troughs 281.

In the operation of this embodiment, the set screws 276 are first released to permit the carriage plate 275 to be shifted longitudinally for focusing purposes, the rollers 280 riding in the tracks 281 during this adjustment. The carriage plate 275 is then locked in position by the set screws 276. The lever 268 is now adjusted in accordance with the scale 273 to provide the selected rate of movement of the carriage plate. Transverse movement of the feed plate 260, caused by the feed mechanism acting upon the rack 239, acts through the slot 262 and pin 263 to cause the slide 264 to slide along the rod 265. The slide 264, acting through the arm 266 and the lever 268, shifts the bracket 269 and the carriage plate 275 an amount which is determined by the angular position of the lever 268 with respect to the arm 266.

In this embodiment, any desired adjustment can be made between the rate of movement of the bracket 269 and that of the film carrier. This adjustment may, of course, be made in accordance with the size of characters being composed and thereby eliminates the necessity of adjustment of the pin bar for this purpose. It may, however, be used to supplement the use of the pin bar if desired. It is to be understood that the type of feed mechanism shown in Figure 16 may be substituted for that disclosed in Figures 1 and 2 if desired.

Figure 19:
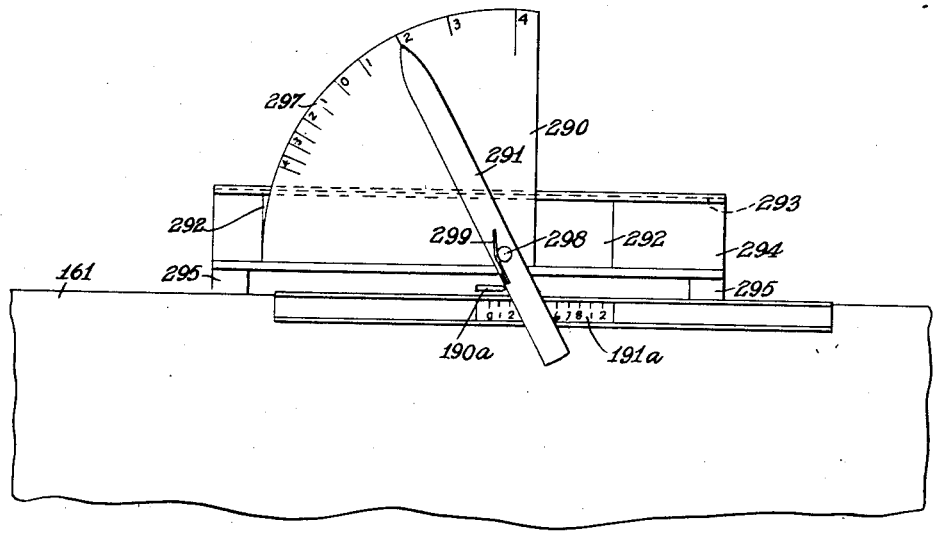
Figure 19 is a detail view of the top of the film holder illustrating a further embodiment of the invention.
Figure 20:
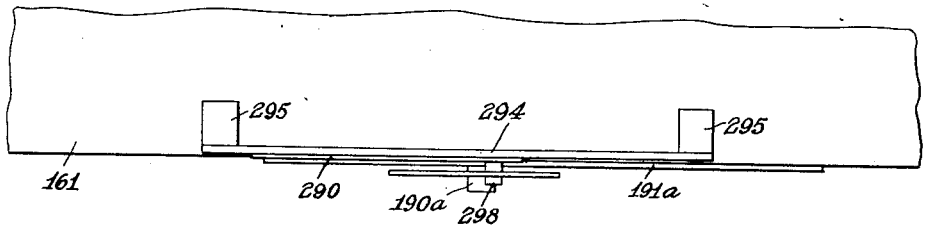
Figure 20 is a top plan view of the portion of the device shown in Figure 19.

Justification gauge of Figures 19 and 20

The pointer 190 of Figure 13, cooperating with the scale 191, shows the position of the last character impressed upon the sensitized material. This pointer may also be used in conjunction with a gauge to give a reading of the justification requirements of each line. Figures 19 and 20 show a device for this purpose. Referring to these figures, it will be noted that the pointer 190a, corresponding to the pointer 190 of Figure 13, extends to the front of the cover 161 of the film holder D and cooperates with a scale 191a to indicate the position of the film. A plate 290, carrying a pointer 291, is provided having ears 292 which are adapted to slide in a channel 293 formed in a frame 294 which is attached, as by flanges 295, to the top of the cover 161. The plate 290 carries a scale 297 cooperating with the pointer 291 to indicate the position thereof. The pointer 291 is pivoted to the plate 290, as at 298, and extends downwardly over the front of the cover 161 to engage and be actuated by the pointer 190a. A spring 299 may be provided for holding the pointer 291 in engagement with the pointer 190a.

In using this device, the plate 290 is shifted in the channel 293 to a position such that when the pointer 190a is at the end of the justified line the pointer 291 will be caused to register with some designated part of the scale 297, such as, for example, an intermediate portion of the scale corresponding to the zero designation. The scale 297 is so graduated that the position of the pointer 291 thereon indicates the amount by which a line is long or short of the predetermined justified length and may read directly in the number of points of correction required.

It is to be understood that this device is primarily intended to produce a reading on an enlarged scale so that the justification requirements can be more accurately and easily determined. This mechanism may be substituted for the pointer 190 and scale 191 of the plate holder shown in Figure 13 if desired. It is also to be understood that the scale 191 of Figure 13 and the scale 191a of Figure 19 may be mounted for sliding adjustment so that they can be shifted in a manner corresponding to the plate 290. In that event, the above-mentioned scales would give a reading indicating the justification requirements.

While only a few of the various embodiments of this invention have been shown herein, it is to be understood that various changes and modifications may be made therein as will be apparent to a person skilled in the art. The mechanism above described is simple to operate and may be cheaply constructed as compared to the usual type-setting machine. Furthermore, the master slides occupy a minimum amount of space and are cheap and simple to produce. A printer can accordingly obtain and file a large number of master slides so as to be in a position to reproduce many different styles of type at a minimum of expense. Furthermore, inasmuch as a single master slide may be used for producing characters of varying sizes, it will be obvious that each slide takes the place of a large number of fonts of type which would otherwise be required for printing. The arrangement is such that the operation is no more complicated than that of a typewriter, the selecting of the character and the exposing of the negative being effected automatically in response to a depression of a selected key.

Although the method of procedure may be varied as required, it is intended that the original unjustified composition be used for proof-reading and correction, after which it may be recomposed, using the justifying bar for producing the final justified copy. This involves considerable less time and labor than would be required in typing the original copy and then setting up and composing a type form therefrom.

The justification device is simple and convenient to operate and automatically distributes the correction through to as many parts of the line as desired. The justification may be effected in a single space or by actuating the justifier bar at each space between words, depending upon the amount of correction and the appearance of the line. The device operates automatically to effect the desired total correction, regardless of the number of spaces in which it is distributed.

If the same justifying space is required at each actuation of the justifier bar, the arm 112 may be adjusted to a position parallel to the direction of feed by shifting the bracket 120 to a selected position on the scale 122 and effecting the same adjustment of the opposite end of the arm 112 on the scale 119. A spring or other means may then be used for returning the justifier bar 110 after each actuation thereof, and it will be noted that the movement of the justifier bar will always be the same due to the parallel position of the arm 112. This movement must, of course, be selected so as to produce the desired justified result. Any selected combination of these methods of operation may be obtained by varying the relative positions of the two ends of the arm 112.

It is to be understood that the invention is not to be restricted to the particular embodiment shown herein by way of illustration, but is only to be limited in accordance with the following claims, when interpreted in view of the prior art.

I claim:

1. In a phototype-composing machine, photographic master type characters, a keyboard having keys connected and arranged to selectively bring designated master type characters into operative position for composing upon depression thereof, a film holder carrying a sensitized film, means including a shutter for photographing the selected type character on said film, feed means for feeding said film transversely for positioning successive characters thereon, a feed bar actuating said feed means by an amount proportional to the movement of said bar, means cooperating with each key upon depression thereof to actuate said feed bar an amount proportional to the width of the character selected by said key, said last means comprising a pin bar carrying a set of pins of graduated lengths, the length of each pin being proportional to the width of the corresponding character, said pins being arranged to be actuated by the depression of the respective keys and to cause an actuation of said feed bar proportional to the length of the actuated pin, and means actuating said shutter upon the return movement of each of said keys.

2. In a phototype-composing machine, a master type slide containing a plurality of rows of type characters, shift means to bring a selected row into operative position, a keyboard having keys connected and arranged to move said slide laterally to bring a selected character of said row into operative position, a film holder containing a sensitized film, means for photographing the selected character on said film, feed means for advancing said film between characters, and means controlling the operation of said feed means comprising a pin bar having a plurality of rows of pins corresponding to the rows of type characters on said master slide, said pins each having a length determined in accordance with the width of the corresponding character, means actuated by said shift means for shifting said pin bar to bring a selected row of pins into operative position, and means associated with said keys to engage the corresponding pins of the selected row for actuating the same.

3. In a phototype-composing machine, a master type slide containing a plurality of rows of selected type characters, shift means to bring a selected row into operative position, a keyboard having keys connected and arranged to move said slide laterally to bring a selected character of said row into operative position, a film holder containing a sensitized film, means for photographing the selected character on said film, feed means for advancing said film between characters, a pin bar having a plurality of rows of pins corresponding to the rows of type characters on said master slide, said pins each having a length determined in accordance with the width of the corresponding character, means actuated by said shift means for shifting said pin bar to bring a selected row of pins into operative position, means associated with each key to cause the corresponding pin of the selected row to actuate said feed means, focusing means to vary the size of the image of the selected character on said film, and adjusting means to adjust said pin bar in accordance with the spacing required for the selected image size.

4. In a phototype-composing machine, a master type slide containing a plurality of rows of selected type characters, shift means to bring the selected row into operative position, a keyboard having keys connected and arranged to move said slide laterally to bring a selected character of said row into operative position, a film holder containing a sensitized film, means for photographing the selected character on said film, feed means for advancing said film between characters, a pin bar having a plurality of rows of pins corresponding to the rows of type characters on said master slide, said pins each having a length determined in accordance with the width of the corresponding character, means actuated by said shift means for shifting said pin bar to bring a selected row of pins into operative position, and means associated with each key to cause the corresponding pin of the selected row to actuate said feed means, said slide and said pin bar both being mounted for removal and replacement whereby the machine may be used for composing different sets of type.

5. In a phototype-composing machine, photographic master type characters, a keyboard having keys connected and arranged to selectively bring designated master type characters into operative position for composing, a film holder carrying a sensitized film, means photographing the selected type character on said film and feed means for feeding said film transversely for positioning successive characters thereon, said last means comprising a ratchet having a plunger arranged to actuate the same in accordance with the axial movement of said plunger and means cooperating with the respective keys to depress said plunger a distance proportional to the width of the corresponding character.

6. In a phototype-composing machine, photographic master type characters, a keyboard having keys connected and arranged to selectively bring designated master type characters into operative position for composing, a film holder carrying a sensitized film, means photographing the selected type character on said film and feed means for feeding said film transversely for positioning successive characters thereon, said last means comprising a ratchet mechanism, a plunger connected to actuate said ratchet by a distance corresponding to the movement of said plunger, means actuated by the depression of each key to cause a movement of said plunger proportional to the width of the corresponding character and means to return the plunger to its original position after each actuation thereof.

7. In a phototype-composing machine, photographic master type characters, a keyboard having keys connected and arranged to selectively bring designated master type characters into operative position for composing, a film holder carrying a sensitized film, means photographing the selected type character on said film, and feed means for feeding said film transversely for positioning successive characters thereon, said last means comprising a one-way ratchet mechanism having a plunger adapted to actuate said means by an amount proportional to the plunger movement, a feed bar actuating said plunger, a set of pins of graduated lengths corresponding to the widths of the various characters actuating said feed bar, and key-actuated means to engage and actuate the selected pins.

8. In a phototype-composing machine, photographic master type characters, a keyboard having keys connected and arranged to selectively bring designated master type characters into operative position for composing, a film holder carrying a sensitized film on which the master type characters are to be photographed, means for photographing the selected character on said film, key-actuated means for advancing the film between successive impressions, justifying means including a justifier bar, means advancing said film a distance proportional to the movement of said justifier bar, and stop means comprising a pivoted arm mounted to feed transversely with said film, means adjusting the angular position of said arm in accordance with the justifying requirements, said pivoted arm being adapted to limit the movement of said justifier bar in accordance with its transverse position, whereby the justifier bar may be successively actuated at different transverse positions of the arm for making a series of adjustments, the total of which is determined by the total throw of said justifier bar until stopped by the pivoted arm in its final transverse position.

9. In combination, a photocomposing machine having master type characters and a film holder carrying a sensitized film, means feeding the film transversely for successively photographing said characters thereon and justifying means to vary the relative positions of said film said master type characters at intervals required to produce a line having a predetermined length, said justifying means including feed mechanism to shift said film relative to and said master type characters, a justifier bar connected and arranged to actuate said feed mechanism by an amount proportional to the movement of said bar, and adjustable stop means comprising a pivoted arm mounted to be actuated for transverse movement by said feed means, and means adjusting the angularity of said arm in accordance with the total justification required, said justifier bar being limited in its movement by said arm so that the range of movement of said justifier bar may increase as the arm is advanced by said feed means, whereby the spacing may be corrected by a series of actuations of said justifier bar and the total correction is independent of the number of such actuations.

10. In combination, a photocomposing machine having master type characters and a sensitized film on which said characters are to be successively photographed, a carriage connected to cause transverse movement of said film, feed means for said carriage comprising a plate mounted for transverse movement, means feeding said plate by predetermined amounts, and mechanical means connecting said plate and said carriage to effect a predetermined ratio of movement therebetween.

11. In combination, a photocomposing machine having master type characters, and a sensitized film on which said characters are to be successively photographed, a carriage connected to cause transverse movement of said film, feed means for said carriage comprising a plate mounted for transverse movement, means feeding said plate by predetermined amounts, mechanical means interconnecting said plate and said carriage, and means adjusting said mechanical means to effect different predetermined ratios between the movement of said carriage and of said plate.

ASHLEY G. OGDEN.

CERTIFICATE OF CORRECTION.

Patent No. 2,207,265. July 9, 1940.

ASHLEY G. OGDEN.

It is hereby certified that error appears in the printed specification of the above numbered patent requiring correction as follows: Page 9, second column, line 27, claim 9, for the words "to and said" read --to said--; and that the said Letters Patent should be read with this correction therein that the same may conform to the record of the case in the Patent Office.

Signed and sealed this 10th day of September, A. D. 1940.

(Seal)

Leslie Frazer,
Acting Commissioner of Patents.